Figure 1:
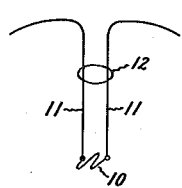

W. L. VAN KEUREN.
HERMETICAL SEAL.
APPLICATION FILED JUNE 15, 1918.

1,427,870.

Patented Sept. 5, 1922.

Inventor:
William L. Van Keuren,
by
His Attorney.

Patented Sept. 5, 1922.

1,427,870

UNITED STATES PATENT OFFICE.

WILLIAM L. VAN KEUREN, OF NORTH BERGEN, NEW JERSEY, ASSIGNOR TO GENERAL ELECTRIC COMPANY, A CORPORATION OF NEW YORK.

HERMETICAL SEAL.

Application filed June 15, 1918. Serial No. 240,180.

*To all whom it may concern:*

Be it known that I, WILLIAM L. VAN KEUREN, a citizen of the United States, residing at North Bergen, county of Hudson, State of New Jersey, have invented certain new and useful Improvements in Hermetical Seals, of which the following is a specification.

In the manufacture of some types of incandescent lamps, such as the miniature lamps often used for portable flash lights and operated by a dry battery, the leading-in wires are sealed into the wall of the lamp by placing them across the end of the tubular neck of the bulb and then butt welding the exhaust tube to the end of the neck, with the leading-in wires embedded in the weld. The percentage of leaky seals is comparatively high because skill is required to make good seals of this type, and the necessary care and skill are difficult to obtain in a large factory.

The object of my invention is to provide a method and means by which the operation of hermetically sealing a leading-in wire into glass is improved and simplified so that it can be successfully performed with less skill and care than has heretofore been necessary. A further object is to insure that the leading-in wire will be thoroughly wet by the glass when pinched between the two walls of glass at a temperature no higher than is necessary merely to weld those walls to each other. A still further object is to improve and cheapen the manufacture of lamps in which the exhaust tube is butt welded to the bulb and the leading-in wires are sealed into the weld during the welding operation.

In accordance with my invention, I coat that portion of the lead wire which is to be embedded in the glass of the lamp with a coating of a glass or enamel, which at the welding temperature of lamp glass, will easily wet the leading-in wire and adhere firmly to it, and is of such a composition that it is stable and does not decompose or break up at the temperature of sealing into the glass and will easily mix with the lamp glass but will not appreciably change its coefficient of expansion. One such glass or enamel which I have found particularly suitable for the practice of my invention is a yellow vitreous lead borate formed by fusing litharge and boric acid in proper proportions. Fused lead borate is referred to as glass in many of the standard works on the manufacture of glass and is also, in other publications, referred to as an enamel, because it is a salt which is more easily fusible into a vitreous substance than the glass generally used for incandescent lamps. The fused lead borate may be powdered and then applied to the leading-in wire by means of some suitable binder.

Figure 2:
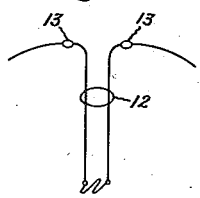
Figure 3:
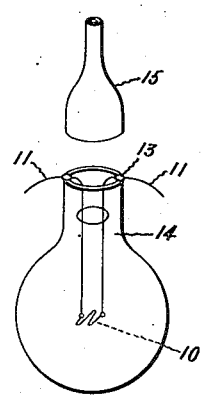
Figure 4:
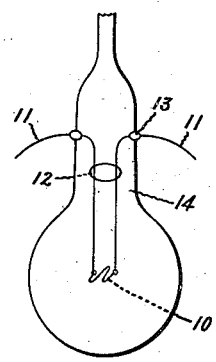
Figure 5:
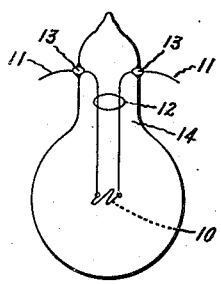

For a better understanding of my invention, reference may be had to the accompanying drawing in which I have illustrated some of the steps of manufacturing a miniature incandescent lamp embodying my invention and in which Fig. 1 is a view of a standard form of mount, composed of the leading-in wires and the filament; Fig. 2 a view of the mount to which some of the lead borate or equivalent material has been applied to the leading-in wires at those points which will be embedded in the glass of the lamp; Fig. 3 a view of a lamp with the mount in position and the exhaust tube ready to be butt welded to the bulb; Fig. 4 the same lamp after the exhaust tube has been welded to the bulb; Fig. 5 a view of the lamp after it has been exhausted and sealed off; and Fig. 6 a view partly in section of a convenient device for applying the lead borate to the leading-in wire.

For convenience I have illustrated my invention as applied to a standard form of lamp, although it will be understood that it is equally useful in any type of lamp to facilitate the formation of a hermetical seal between the leading-in wire and the glass of the lamp. The form of lamp illustrated has a mount which, as shown in Fig. 1, consists of a filament 10 carried by two comparatively stiff leading-in wires 11, which are held in proper relation by a glass bead 12. For the leading-in wires I prefer to use a compound wire consisting of a nickle steel core and a copper shell or sheath welded to it, the core and shell being so proportioned that the wire as a whole has a coefficient of expansion about the same as, or somewhat less than, that of the lamp glass, but my invention is useful in connection with other leading-in wires of base metal having substantially the same coefficient of expansion as glass, such, for example, as alloys of nickel and iron containing from 47 per cent to 50 per cent of nickel.

In accordance with my invention, each leading-in wire of the standard form of mount shown in Fig. 1 has applied to it, at the point where it is sealed to the lamp glass, a glass or enamel coating or sleeve 13 which is more fluid, that is, less viscous, at glass welding temperatures than the lamp glass, and is stable at those temperatures, and which will not only readily mix with and be absorbed by the lamp glass, but will not change the properties or coefficient of expansion of the lamp glass to an appreciable extent, so that it does not cause cracks in the glass. When the lamp is being assembled the mount is placed in the bulb 14, as illustrated in Fig. 3. As illustrated in the drawing the free ends of the leads 11 are bent outward so that when the mount is suspended in the bulb the sleeves 13 will rest on the edge of the neck. The exhaust tube 15, of the same size as the tubular neck of the bulb 14, is then brought into the position shown in Fig. 3, with its end immediately above the neck of the bulb. The adjacent ends of the exhaust tube 15 and the neck of the bulb 14 are heated to a temperature at which glass welds readily, and the exhaust tube is then butt welded to the neck of the bulb with the leading-in conductors 11 and the sleeves 13 embedded in the weld, as shown in Fig. 4. The lamp is then exhausted and sealed off and is then in the form shown in Fig. 5, ready for basing.

Figure 6:
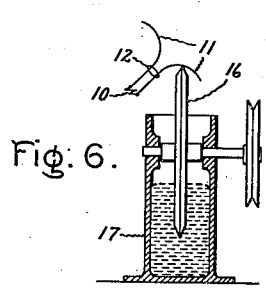

The glasses or enamels which I have found to be useful in the practice of my invention are borates of proper composition to have the characteristics above mentioned, and one material which I have found to be particularly well adapted for making the glass coating or sleeves 13 on the leading-in wires is a vitreous substance formed by mixing 70 to 75 per cent of litharge, (PbO) with 25 to 30 per cent of boric acid $(H_3BO_3)$ and melting the mixture at about 900° C. in a battersea or porcelain crucible to produce a clear yellow glass or enamel, which is then broken up and powdered in a steel ball mill until the powder will pass through a 100 mesh sieve. A convenient way of breaking up the glass before powdering it in the mill is to pour the molten glass from the crucible into water. This borate glass does not decompose or break up at glass welding temperatures and is therefore stable at those temperatures. If the constituents of this glass are intimately mixed and applied to the wire, bad seals are obtained, apparently because some of the litharge reduces to lead, even though the sealing-in fires are oxidizing, and some of the boric acid decomposes instead of combining with the litharge. The powder is then mixed with some suitable binder, such as amyl acetate or a watery solution of gum arabic to make a thin paste. About 50 cubic centimeters of amyl acetate to 200 grams of the powder will produce a paste of suitable consistency. This paste may be applied to the leading-in wires in various ways as by the use of a brush, by dipping the wires into the paste, or preferably, by means of a rotating wheel which dips into a mass of paste and thereby keeps it continuously agitated and at the same time carries enough paste on its rim, so that when the leading-in wire is touched to the rim of the wheel the wire will be coated with a sufficient amount of paste. A device suitable for this purpose is illustrated in Fig. 6, in which a wheel 16, preferably having a sharp edge as shown, is mounted to rotate in a reservoir 17 containing the paste, the lower edge of the wheel dipping into the paste and its upper edge being exposed so that the leading-in wires 11 of the mounts may be conveniently touched to the rim of the wheel so as to coat them with the paste. The wheel should be rotated about 80 revolutions per minute which will keep the paste thoroughly stirred and mixed.

The paste coatings 13 on the leading-in wires are allowed to dry, and are then ready for the operation of sealing-in. At the beginning of the operation the end of the exhaust tube 15 should be spaced about $\frac{3}{8}''$ away from the end of the neck of the bulb of the lamp as illustrated in Fig. 3, and the fires directed midway between the exhaust tube and the bulb so as to heat the two ends which are to be welded. As soon as the end of the exhaust tube becomes slightly viscous the bulb and tube are brought together and then the heating is continued until they are thoroughly welded. During the entire operation the fires should be so adjusted as to be strongly oxidizing, so as to avoid reducing the lead salt contained in the paste. The proper adjustment of the fires in this respect can be easily determined by observing whether the glass remains clear during the seal making, in which case the fires are properly adjusted, or whether it becomes cloudy, which indicates that the fires are causing some reduction of the lead salt.

While I do not wish to be restricted to any particular theory of operation, the desirable results obtained by the use of my invention seem to be due to the property of the lead borate becoming slightly less viscous or more fluid than the glass itself at the welding temperature of the glass and at the same time of uniting completely with the glass without causing any substantial change in the coefficient of expansion of the glass. The lamp glass commonly used does not appear to wet the leading-in wires as completely as is desirable unless the glass is heated somewhat above its welding temperature, but to give the weld this extra heating without overheating and burning off of the lead wires requires considerable skill and care. Much less skill is required merely to weld the exhaust tube to the bulb, and by my invention the glass need be heated only to the welding temperature because the lead borate on the leads insures a good wetting of the wires and a hermetical seal at this temperature.

What I claim as new and desire to secure by Letters Patent of the United States, is:—

1. The method of sealing into glass a conductor with an oxidizable surface and adapted to make a permanent hermetical seal with glass which consists in applying to the portion of the conductor to be sealed a lead borate enamel having substantially the same properties as glass and stable at sealing-in temperatures and proportioned to be slightly less viscous than the glass at sealing-in temperature and to produce no substantial change in the coefficient of expansion of the glass with which it merges during sealing-in, and then heating the glass and said enamel to form a hermetical seal with the conductor.

2. The method of sealing a conductor with an oxidizable surface into permanent hermetical junction with glass which consists in coating a portion of the conductor with a lead borate enamel having substantially the properties of glass and stable at welding temperatures of glass and proportioned to be slightly less viscous than glass at the welding temperature of glass, heating the glass at the seal to welding temperature and welding the heated glass around the conductor to form a mass of glass with said coated portion embedded therein.

3. The method which consists in interposing between the neck of a glass lamp bulb and the end of a glass tube and oxidizable conductor of substantially the same coefficient of expansion as glass and having a portion coated with lead borate and welding the tube to the bulb with the coated portion of said conductor embedded in the weld.

4. An incandescent lamp having an oxidizable leading-in conductor in fused permanent hermetical juncture with a body of lead borate fused into the glass of the lamp and proportioned to cause substantially no change in the coefficient of the glass when fused to it.

5. An incandescent lamp having an oxidizable conductor of substantially the same coefficient of expansion as glass and permanently hermetically sealed into the glass of the lamp by means of a seal consisting essentially of unreduced lead borate fused to said conductor and to the glass of the lamp and stable at sealing-in temperature proportioned to be slightly less viscous than the glass at sealing temperature and to produce substantially no change in the coefficient of expansion of the glass.

6. A seal for an oxidizable leading-in wire having substantially the same coefficient of expansion as glass and hermetically sealed in glass consisting essentially of lead borate in fused juncture with said conductor and with the glass and stable at sealing-in temperature and proportioned to be slightly less viscous than the glass at the sealing-in temperature and to have substantially the same coefficient of expansion as the glass.

7. A seal for an oxidizable leading-in conductor having substantially the same coefficient of expansion as glass and hermetically sealed in glass consisting essentially of unreduced lead borate fused in juncture with said conductor and the glass and proportioned to cause no substantial change in the coefficient of expansion of the glass.

In witness whereof, I have hereunto set my hand this 7th day of June, 1918.

WILLIAM L. VAN KEUREN.